United States Patent
Hopkins et al.

(10) Patent No.: US 8,310,126 B1
(45) Date of Patent: Nov. 13, 2012

(54) RADIAL FLUX PERMANENT MAGNET AC MOTOR/GENERATOR

(75) Inventors: Thomas H. Hopkins, Vail, CO (US); Nicholas R. Bries, Pine Grove, CO (US); Scott T. Graham, Littleton, CO (US); Howard F. Hendricks, Prescott, AZ (US); Patrick J. Stoever, Lakewood, CO (US)

(73) Assignee: Motor Patent Licensors, LLC, Wheat Ridge, CO (US)

( * ) Notice: Subject to any disclaimer, the term of this patent is extended or adjusted under 35 U.S.C. 154(b) by 0 days.

(21) Appl. No.: 13/317,760

(22) Filed: Oct. 27, 2011

(51) Int. Cl.
*H02K 1/14* (2006.01)

(52) U.S. Cl. .............. 310/216.079; 310/43; 310/58; 310/64; 310/156.19; 310/216.057; 310/216.081; 310/216.114; 310/216.119

(58) Field of Classification Search .............. 310/43, 310/58, 64, 156.08, 156.12, 156.19, 216.004, 310/216.057, 216.066–216.067, 216.074, 310/216.079, 216.084–216.086, 216.114–216.115, 310/216.119
See application file for complete search history.

(56) References Cited

U.S. PATENT DOCUMENTS

| | | | |
|---|---|---|---|
| 4,048,530 A * | 9/1977 | Kaufman, Jr. ................. 310/89 |
| 4,384,226 A * | 5/1983 | Sato et al. ..................... 310/89 |
| 5,095,237 A * | 3/1992 | Bardas et al. ................ 310/90.5 |
| 5,689,147 A | 11/1997 | Kaneda et al. |
| 5,744,880 A * | 4/1998 | Kudoh et al. ................. 310/58 |
| 5,903,082 A | 5/1999 | Caamano |
| 5,918,360 A | 7/1999 | Forbes et al. |
| 6,140,728 A * | 10/2000 | Tomita et al. .......... 310/216.079 |
| 6,384,496 B1 | 5/2002 | Pyntikov et al. |
| 6,573,632 B2 * | 6/2003 | Hsu ............................ 310/254.1 |
| 6,617,746 B1 | 9/2003 | Maslov et al. |
| 6,700,279 B1 | 3/2004 | Uchiyama et al. |
| 6,717,323 B1 | 4/2004 | Soghomonian et al. |
| 6,727,629 B1 | 4/2004 | Soghomonian et al. |
| 6,879,069 B1 * | 4/2005 | Weidman et al. ............... 310/61 |
| 6,880,229 B2 * | 4/2005 | Zepp et al. ..................... 29/596 |
| 7,541,711 B2 | 6/2009 | Adaniya et al. |
| 7,626,301 B2 * | 12/2009 | Enomoto et al. ........ 310/216.004 |
| 7,898,134 B1 | 3/2011 | Shaw |
| 2004/0150283 A1 * | 8/2004 | Calfo et al. ............... 310/156.55 |
| 2005/0057106 A1 * | 3/2005 | Allen et al. ..................... 310/54 |
| 2008/0067887 A1 * | 3/2008 | Toyoda et al. ................. 310/218 |

* cited by examiner

*Primary Examiner* — Tran Nguyen
(74) *Attorney, Agent, or Firm* — William E. Hein

(57) ABSTRACT

A radial flux permanent magnet AC motor/generator employs a flat circular stator plate having a plurality of separately-formed electromagnets mounted in a ring pattern on a top surface thereof. A circular flux ring fabricated of powdered metal is mounted to the stator plate outside the ring of electromagnets. A plurality of permanent magnets are mounted in a ring pattern on the outer cylindrical surface of a steel rotor. The stator plate and rotor are axially and diametrically aligned such that the ring of permanent magnets rotates in close proximity to and inside the ring of electromagnets. The electromagnets utilize powder metal cores shaped to have rounded corners and flat sides that permit the use of heavier gauge windings and eliminate the air gaps that exist between the core and windings of prior art electromagnets.

56 Claims, 7 Drawing Sheets

RADIAL FLUX PERMANENT MAGNET AC MOTOR/GENERATOR

BACKGROUND AND SUMMARY OF THE INVENTION

This invention relates generally to permanent magnet motors and generators and, more particularly, to a highly efficient sealed AC radial flux motor/generator having a ring of permanent magnets mounted on the cylindrical surface of an inner rotor and having a ring of electromagnets mounted on an outer stator such that outwardly facing surfaces of the permanent magnets rotate in close proximity to the inwardly facing surfaces of the ring of electromagnets.

Variable speed electric motors of different types have been employed in a variety of applications over the years, most recently in electric vehicles. One such motor is the series DC motor, which employs brushes and wound coils. These motors suffer from low peak power densities. Thus, they are heavy and unresponsive; they are not sealed since air flow through the motor is required to cool the rotor; and they cannot run in reverse. Furthermore, their speed is difficult to control under varying load conditions, and they have no power regeneration capability.

Three-phase asynchronous AC induction motors are typically powered by a DC battery pack coupled to a DC/AC inverter and associated pulse width modulation circuitry to achieve variable speed control. These motors are characterized by heavy weight, low torque, and power factor losses. Power electronics are employed to receive a DC voltage supplied by a battery pack and produce an AC voltage whose waveform frequency is modulated so that the motor's speed may be varied. These motors offer good speed control, are brushless, can be sealed, can run in reverse, and provide power regeneration. However, AC induction motors exhibit low starting torque, which means they usually require a gear box, have power factor losses, are typically more expensive than series DC motors, and the controller required to vary the motor's speed is large, complex and expensive as it must handle the slippage between the input current and the rotational speed necessary for such an asynchronous motor to operate.

Brushless DC motors, a more recent development, are lighter, more powerful, produce more torque, and are typically more efficient than comparably sized AC induction motors. These motors use permanent magnets mounted on the rotor, obviating the need for brushes as no power need be supplied to the rotor. Power to the electromagnets mounted on the stator is typically controlled by power electronics that sense the position of the rotor permanent magnets with Hall sensors and use six-step commutation and pulse width modulation to control the electromagnets. These motors offer good speed control, power regeneration, are brushless, are sealed to protect the internal components from dirt and foreign particles, are reversible, are lighter in weight, are more powerful, are more efficient than series DC motors, and exhibit higher torque than AC induction motors.

The most recent development in motor art is the permanent magnet AC motor which is virtually identical to the brushless DC motor except that it uses more precise sinusoidal control than six-step commutation, with the result that the motor delivers more torque, especially at the higher speeds at which it is capable of operating. Sinusoidal controllers typically require encoders or resolvers, rather than Hall sensors, to more accurately signal the position of the rotor electromagnets so that power can be applied to them as a smooth sinusoidal waveform rather than as a stepped waveform. Thus, the essential difference between a brushless DC motor and a permanent magnet AC motor lies not in the motor itself but in how it is driven, either sinusoidally or by step commutation, and in the required sensing. As a broad class, brushless DC (BLDC) motors and permanent magnet AC (ACPM) motors are appropriately referred to simply as permanent magnet motors. Unlike asynchronous AC induction motors, there is no slippage between the input current and the motor speed and so an ACPM motor controller is lighter, less complex, and less expensive than the controllers used for AC induction motors.

A permanent magnet motor, whether a BLDC or an ACPM motor, is usually one of two types. The first type is a radial flux motor in which the magnetic flux field in the air gap between the rotating permanent magnets and the stationary electromagnets is produced in a radial direction from the center of the motor to the outside thereof, and vice versa. The second type is an axial flux motor in which the magnetic flux field in the air gap between the rotating permanent magnets and the stationary electromagnets is produced in an axial direction parallel to the axis of rotation of the rotor. Both types of motors offer good magnetic structures, but radial flux motors have a mechanical advantage in that the attractive and repulsive forces between the permanent magnets and electromagnets are carried by the rotor and stator flux rings in tension or compression, while those forces are carried in axial flux motors by the rotor and stator plates in bending, thus requiring a heavier structure and heavier bearings.

Permanent magnet AC and DC motors are known in the prior art. U.S. Pat. No. 5,689,147 to Kaneda et al. is directed to a brushless motor having a toothed stator core. U.S. Pat. No. 5,903,082 to Caamano is directed to an axial flux motor/generator having a laminated amorphous metal core. U.S. Pat. No. 5,918,360 to Forbes et al. is directed to a radial flux motor having individually-wound laminated electromagnetic cores. U.S. Pat. No. 6,700,279 to Uchiyama et al. is directed to a brushless motor in which the electromagnet cores are teeth on the stator flux ring, U.S. Pat. No. 6,384,496 to Pyntikov et al. is directed to a multiple-magnetic-path motor in which electromagnets are arranged in pairs rather than individually. U.S. Pat. No. 6,617,746 to Maslov et al. is directed to a radial flux motor in which electromagnets are arranged in pairs rather than individually. U.S. Pat. No. 6,717,323 to Soghomonian et al. is directed to a radial flux motor in which electromagnets are arranged in pairs rather than individually. U.S. Pat. No. 6,727,629 to Soghomonian et al. is directed to a radial flux motor in which electromagnets are arranged in pairs rather than individually. U.S. Pat. No. 7,541,711 to Adaniya et al. is directed to a radial flux motor in which the electromagnet coils are wound on sharp-cornered stator teeth. U.S. Pat. No. 7,898,134 to Shaw is directed is directed to a radial flux motor that utilizes a double rotor rather than a stator flux ring.

Representative of the prior art cited above is the motor/generator 1000 illustrated in FIG. 1 of the present drawings that includes a stator flux ring 1100, a plurality of teeth 1200 formed to protrude inwardly from stator flux ring 1100 serving as the cores of stator electromagnets like electromagnet 1401 of FIG. 2, and a like plurality of shoes 1300 positioned at the inward ends of the teeth 1200 for the purpose of optimally diffusing the magnetic flux field produced by the stator electromagnets 1401. Stator flux ring 1100, teeth 1200, and shoes 1300 are typically formed as a single laminated component using steel plates stamped from a stack of steel plates. The use of laminated steel plates minimizes eddy currents and consequent iron losses in the finished component and also provides the mechanical strength required to resist the rotational forces applied at the shoes 1300. Stator flux ring 1100 is conventionally mounted to a stator plate or directly to the motor case so that the shoes 1300, electromagnets 1401, and stator flux ring 1100 are able to transfer those rotational forces to the external body to which the motor is mounted.

Each of the teeth 1200 is typically wound with insulated wire 1400 to form the electromagnet 1401 shown in cross-section in FIG. 2. As illustrated, the windings 1400 contact the square corners 1202 of the teeth 1200, thus leaving a considerable air gap 1450 between the windings 1400 and the laminated core material that forms each of the teeth 1200. Electromagnets 1401 can be formed with an air core only, but in that case would produce a much lower magnetic force. Ferrous cores serve to greatly increase the magnetic force produced by any electromagnet. Thus, the magnetic force produced by prior art electromagnet 1401 is limited due to the presence of the air gap 1450. Because the physical size of electromagnets 1401 is limited in any given motor design, the size of copper wire 1400 is also limited, thus increasing the resistive losses in the windings. In addition, it is difficult to mechanize the winding of teeth 1200 in the presence of shoes 1300, so winding is typically accomplished manually, at much higher cost.

The theory of operation of the prior art motor/generator 1000 of FIG. 1 is well understood by those skilled in the art. The magnetic flux field produced by each of the electromagnets 1401 is selectively switched on and off by an electronic controller, based on the relative position of the rotor with respect to the stator. This magnetic flux field extends through the shoes 1300 and the air gap 1800 and interacts with the magnet flux field produced by the permanent magnets 1600, which are either mechanically or adhesively mounted on the rotor flux ring 1700, thereby producing rotational motion of the rotor body 1750 and of a drive shaft to which it may be connected. The space 1850 between the finish cover 1990 and the stator 1100 can be filled with a heat conducting epoxy or left empty.

The present application is directed to a radial flux permanent magnet AC motor/generator having a magnetic and mechanical structure that is unlike any of the representative prior art motors described above.

In accordance with the illustrated preferred embodiment of the present invention, a radial flux permanent magnet AC motor/generator employs a flat circular stator plate having a plurality of electromagnets mounted in a ring pattern on an inner face thereof. A circular flux ring fabricated of powder metal is permanently mounted to the stator plate outside the ring of electromagnets. Permanent magnets are mounted in a ring pattern on the outer cylindrical surface of a steel rotor. The stator plate and the rotor are axially and diametrically aligned such that the ring of permanent magnets rotates in close proximity to and inside the ring of electromagnets and such that the magnetic flux field across the air gap between the permanent magnets and electromagnets is in the radial direction. The electromagnets utilize powder metal cores which minimizes eddy currents and resultant heat losses, to permit the use of heavier gauge copper windings to minimize resistive power losses and attendant heat, and to allow the use of higher frequency drivers to further increase the magnetic force produced by the electromagnets.

The radial flux permanent magnet AC motor of the present invention utilizes electromagnets whose cores are not simply tooth extensions formed along the inner edge of a laminated flux ring, in accordance with the prior art. Instead, the electromagnets of the present invention are separately formed units that can be more easily wound, using automatic machines, and that are made of powder metal that can be shaped to have rounded corners and flat sides that permit the use of heavier gauge windings and facilitate heat removal. Further, by so shaping the electromagnet cores, the usual air gaps between a core and the windings thereon are eliminated, resulting in the production of a stronger magnetic field.

The electromagnets are anchored to resist the rotational forces produced by the motor through the use of a structural epoxy material filling the space between each of the electromagnets and the stator surface on which the electromagnets are positioned. The epoxy material in turn transfers the rotational forces to non-metallic anchor plates that are mounted to the stator midway between each of the electromagnets. This is unlike prior art motors in which the electromagnet cores are tooth extensions of the flux ring and rotational force is transferred through the core to the flux ring.

The precise location of the rotor is monitored through the use of a conventional encoder or resolver, and conventional sinusoidal control circuitry is employed to direct operating power and to control the speed of the motor.

The present motor exhibits higher power density and lighter weight than prior art permanent magnet AC motors or brushless DC motors. It is also more efficient, resulting in low heat generation, the small amount of which may be quickly conducted away by means of a liquid coolant circulated through tubes imbedded in the stator and positioned under the electromagnets. Alternatively, heat may be conducted to an outer surface of the motor that is air-cooled or by connecting the motor to a large heat sink such as the body of a vehicle using metallic heat conducting fasteners or a heat strap.

The present motor may be driven to 200% of its sustainable continuous current to thereby double the output horsepower for short periods of time. It is reversible, is capable of power regeneration, and offers good speed control. By employing a large diameter rotor and many electromagnet pole pieces, and by increasing the power of the electromagnets through the use of heavier gauge windings and more flux magnifying material in the cores, the present motor exhibits up to 200% more starting torque than prior art brushless DC and permanent magnet AC motors, thus eliminating the need for a gear box or clutch in electric vehicle applications. Since the rotor components are individually assembled and the electromagnet coils are machine wound, the present motor can be manufactured at a cost saving over prior art motors.

In summary, the AC motor/generator of the present invention 1) utilizes electromagnet cores fabricated of a high-performance powder metal material to increase their performance over prior art laminated steel cores; 2) utilizes electromagnets wound with heavy gauge copper wire to minimize resistive losses; 3) eliminates any air core from the electromagnets thereof to thereby increase the magnetic force produced by the electromagnets; 4) utilizes electromagnets having a flat surface that is interfaced to the stator surface to provide improved heat conduction from the electromagnets to the stator; 5) utilizes separately formed cores and shoes in order to facilitate machine winding of the electromagnets; 6) utilizes electromagnetic cores that are separate from the flux ring and shoes to further enable machine winding of the electromagnets; 7) utilizes a structural epoxy material in combination with non-metallic anchor plates to anchor the electromagnets to the stator; and 8) utilizes wedges to hold the permanent magnets to the rotor surface to provide resistance to rotational forces, thereby eliminating the prior art use of screws that penetrate the permanent magnets, displacing some of the magnetic material thereof and reducing their magnetic field strength.

DESCRIPTION OF THE PREFERRED EMBODIMENT

Figure 1:
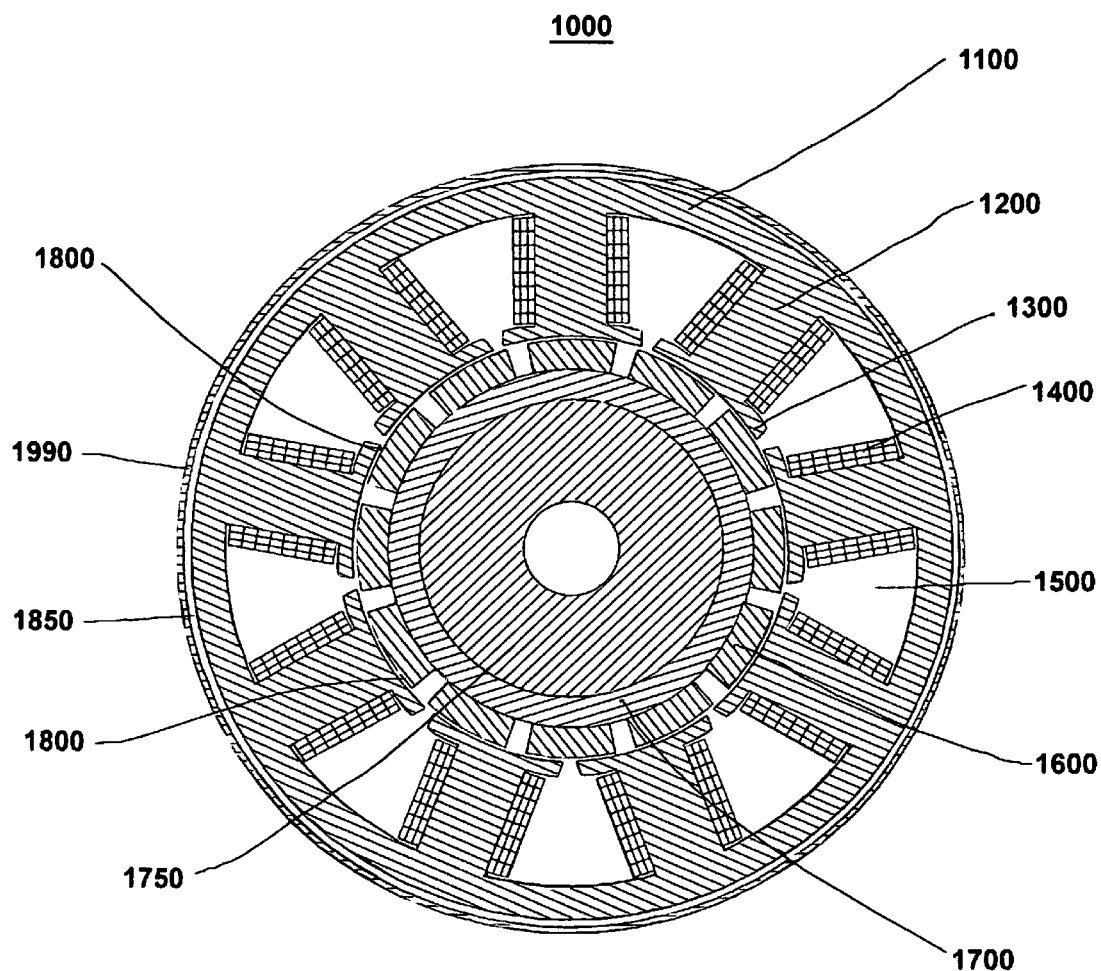
FIG. 1 is a diametrical cross-sectional plan view of a prior art permanent magnet motor, showing both the stator and rotor assemblies.
Figure 3:
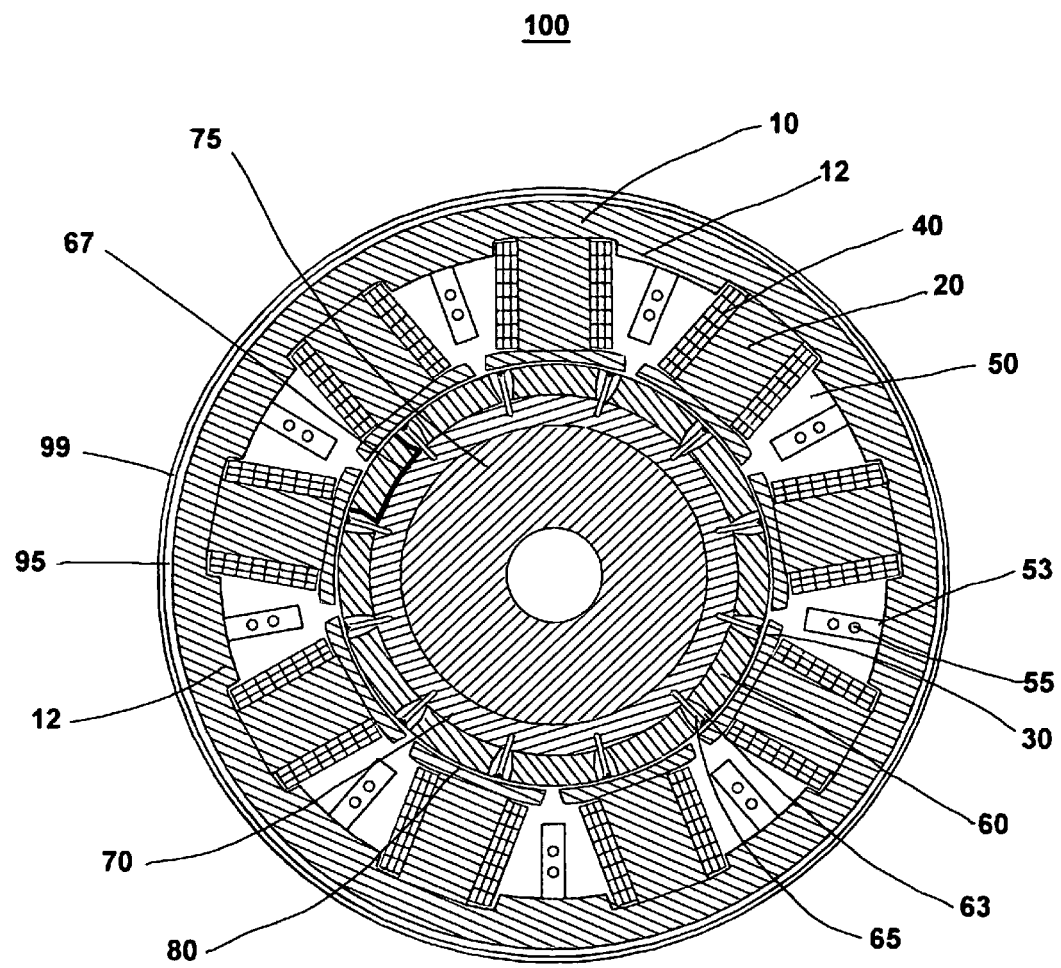
FIG. 3 is a diametrical cross-sectional plan view of the motor/generator of the present invention, showing both the stator and rotor assemblies

Referring now generally to FIGS. 3-8, there is shown the stator and rotor assemblies of a motor/generator 100 in accordance with the present invention. Referring more specifically to FIG. 3, there is shown a stator flux ring 10, constructed of powder metal, a plurality of separate powder metal cores 20 wound as individual electromagnets and positioned immediately adjacent to and in contact with the stator flux ring 10, and a like plurality of shoes 30 also constructed of powder metal to diffuse the magnetic flux field produced by each of the electromagnets. The powder metal stator flux ring 10, powder metal cores 20, and powder metal shoes 30 are not fabricated as a single component, as in the case of prior art motor 1000 of FIG. 1, but as separate components to facilitate their manufacture using molds and presses and to facilitate machine winding of the cores 20 to form electromagnets. The stator flux ring 10 provides a path for the magnetic flux field between the electromagnets.

The use of powder metal for fabricating the stator flux ring 10, electromagnet cores 20, and shoes 30, rather than laminated steel plates, as in the prior art, provides the advantages of allowing the cores 20 to be machine wound, optimally shaped for winding with heavy copper wire, and for improved heat dissipation. The use of powder metal in fabricating these components also reduces eddy currents in the flux ring 10, cores 20, and shoes 30 at power frequencies higher than the usual 60 Hz, above which laminated steel plates suffer significant and increasing eddy currents and losses. When direct-connected to the drive wheels of an electric vehicle, motor 100 must run at electrical power frequencies up to 400 Hz.

Figure 2:
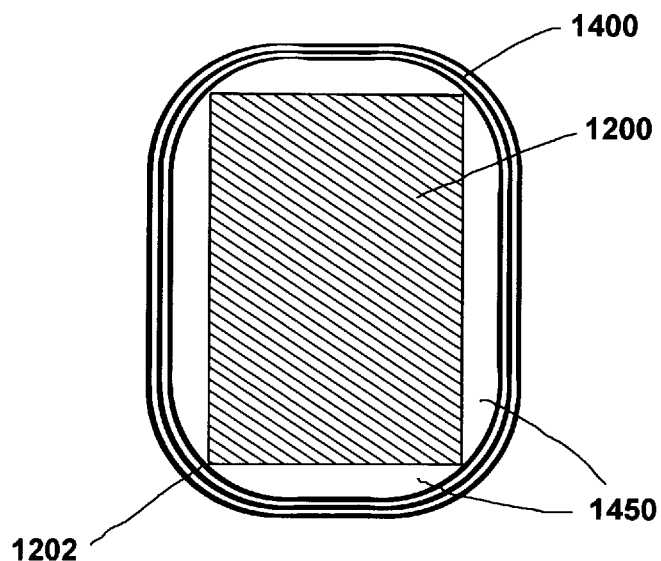
FIG. 2 is a cross-sectional elevation view through of one of the electromagnets of the prior art motor of FIG. 1.
Figure 6:
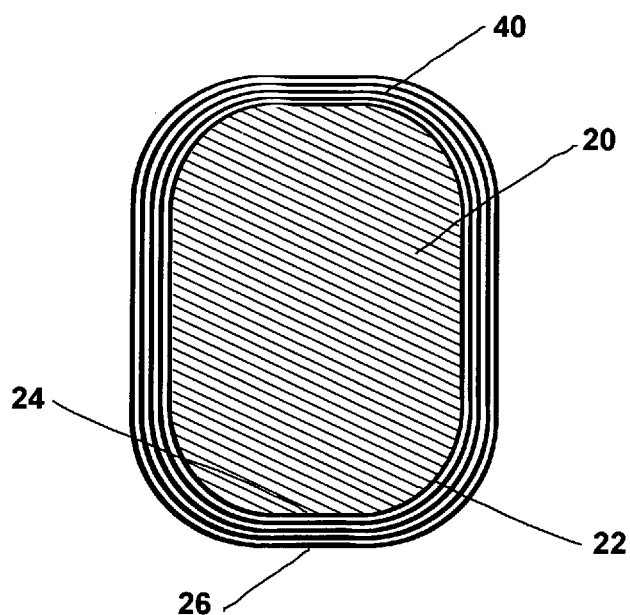
FIG. 6 is a cross-sectional elevation view of one of the stator electromagnets employed in the motor/generator of FIGS. 3 and 5.
Figure 5:
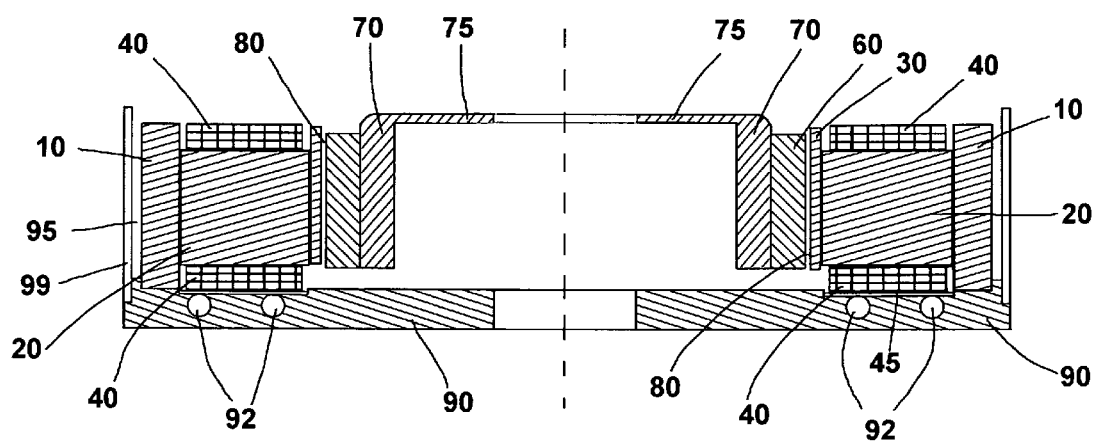
FIG. 5 is a diametrical cross-sectional elevation view of the motor/generator of FIG. 3.

Referring now to FIG. 6, there is shown a cross-sectional elevation view of one of the stator electromagnets employed in the motor/generator of FIGS. 3 and 5. Flux ring 10, core 20, and shoe 30 are fabricated of a commercially available powder metal such as AnchorLam or Somaloy and is shaped to have rounded corners 22, as illustrated, and an otherwise flat outer surface to facilitate good contact between the first layer of windings 40 and the outer surface of the core 20. The resulting flat bottom surface 26 of each of the wound electromagnets provides an improved interface for heat conduction to an aluminum stator plate 90. The rounded corners 22 of electromagnet cores 20 permit them to be tightly wound with a heavier insulated wire that is preferably rectangular in cross section for easy bending. The result is that the first layer of winding 40 contacts the core 20 at all points on its outer peripheral surface, thereby eliminating any of the air voids 1450 that are typically present in prior art electromagnets like that of FIG. 2. Thus, wire equivalent to 5-gauge square wire can be wound onto a small core whose overall height and width dimensions are as small as 1.75 inch by 1.15 inch, respectively. The air void 1450 in the prior art electromagnet 1401 of FIG. 2 is the result of the laminated steel core material 1200 being punched from a stack of steel plates to have sharp corners 1202 that prevent the first layer of windings 1400 from being in close and complete contact with the top, bottom, and side surfaces of the core 1400. By maximizing the cross-sectional area of electromagnet core 20, as illustrated in FIG. 6, the magnetic force produced by the electromagnet is increased.

The depth of the windings 40 of the electromagnet of FIG. 6 is clearly greater that the depth of the windings 1400 of the FIG. 2 prior art electromagnet 1401 having the same overall dimensions. Mobile applications that employ electric motors, such as electric vehicles, have limited space for fitting a motor, thereby restricting the dimensions of the electromagnets themselves. By increasing the depth and weight of the windings 40 of the electromagnets employed in the present motor, reduced copper losses are achieved for a given current or much higher currents are obtainable, resulting in higher torque output, for the same gauge wire. Alternatively, more turns can be wound onto the electromagnet core 20 in a given space, thus increasing the ampere turns parameter and, hence, the magnetic force produced by the electromagnet.

The electromagnets of FIG. 6 are not anchored as being extensions of the stator flux ring 10 that is fastened to the aluminum stator plate 90, as is the case in prior art motors. Instead, the stator flux ring 10 of FIG. 3 is formed to include wide teeth 12 that protrude into the space between the electromagnets and against which the electromagnets bear. Anchor plates 53, constructed of a commercially available non-metallic engineered polymer such as PEEK, are positioned between the electromagnets and are mechanically attached to the aluminum stator plate 90 by stainless steel anchor screws 55. The space between the electromagnets and each of the anchor plates 53 and wide teeth 12 is filled with a structural epoxy potting material 50, against which the electromagnets bear when subjected to the rotational forces produced during motor operation. Those forces are first transmitted to the anchor plates 53, then to anchor bolts 55, then to the stator plate 90, and finally to the external structure to which motor 100 is mounted.

The shoes 30 are made of powder metal, like electromagnet cores 20 and flux ring 10. As may be seen in FIG. 7, the shoes 30 are slanted in order to reduce cogging torque as the permanent magnets 60, mounted on the outer cylindrical surface of the rotor flux ring 70, move from one of the stator electromagnets to the next. Shoes 30 cannot be mechanically attached to the electromagnet cores 20 whose powder metal composition is soft and brittle. Instead, shoes 30 are anchored by stainless steel screws 33 located at the distal acute-angled corners of each of the shoes 30 that is positioned in a magnetic null zone midway between the electromagnets. Shoes 30 are potted into a structural epoxy material 50 that fills the space between the electromagnets.

Figure 4:
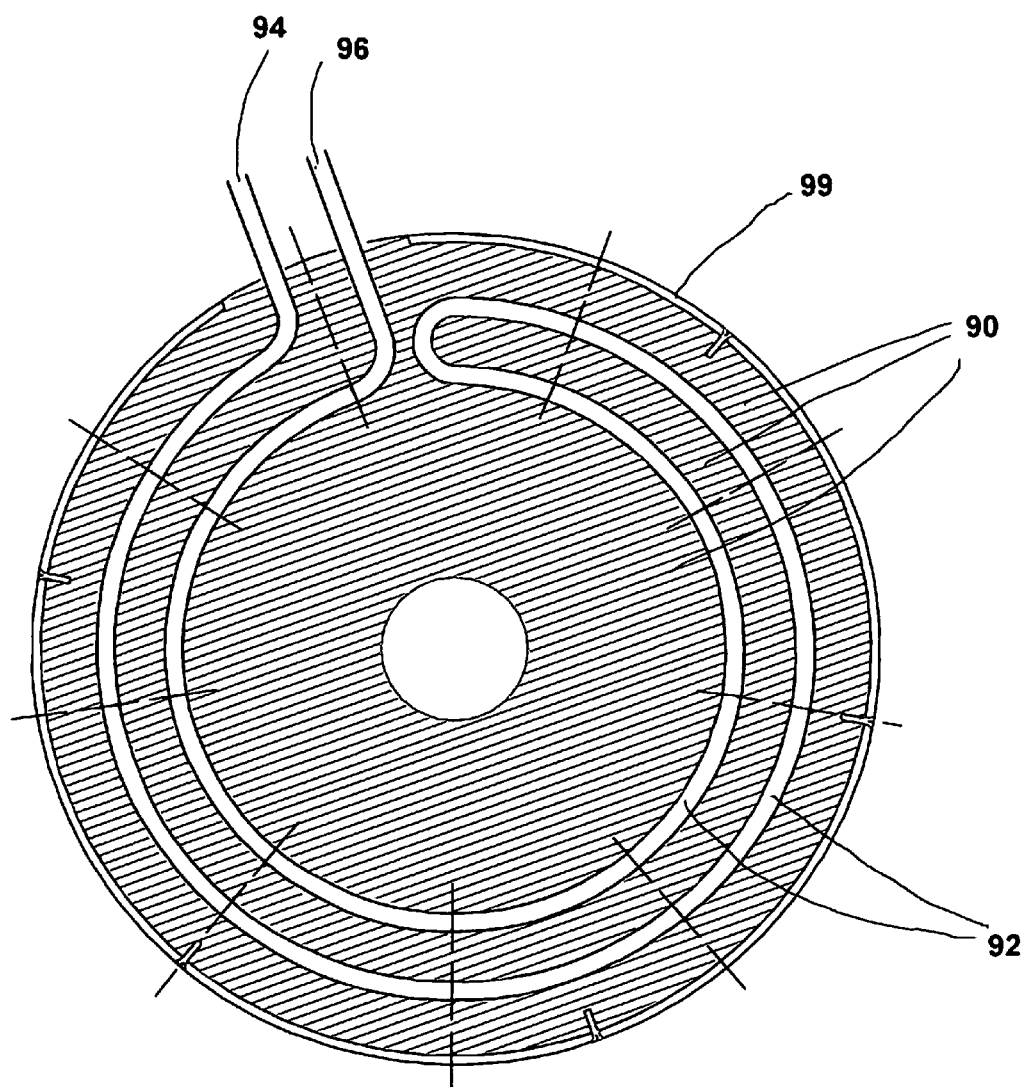
FIG. 4 is diametrical cross-sectional plan view through the stator plate of the motor/generator of the present invention, showing coolant tubes embedded in the stator for conveying a liquid coolant that serves to conduct heat away from the motor.

Heat that is generated primarily in the windings 40 of the electromagnets must be conducted away and dissipated. Each of the electromagnets is positioned on a separate sill pad 45 that overlies stator plate 90. Each of the sill pads 45 provides electrical isolation of the flat bottom surface 26 of an associated one of the electromagnets from stator plate 90. In addition, since each of the sill pads 45 has a high dielectric coefficient, they can made sufficiently thin to conduct heat to stator plate 90. A coolant such as a water/glycol mixture is circulated through a copper tube 92, imbedded in a groove provided in stator plate 90, as shown in FIGS. 4 and 5, by way of inlet and outlet ports 94, 96 to an external heat exchanger. The routing of tube 92 within stator plate 90, as illustrated in FIG. 4, to include two parallel circular paths, one outgoing and one return, connected by a U-turn at the far end, ensures equal average temperature of the coolant in the two tubes beneath each electromagnet.

The electromagnets of the present motor/generator are potted using a structural epoxy 50 that is also heat conducting in order to transfer heat from the windings 40 to the aluminum stator plate 90 or to the stator flux ring 10, then through a heat conductive epoxy 95 located between the stator flux ring 10 and the motor/generator case 99 for external dissipation. Additional heat generated by both iron and hysteresis losses within the electromagnet cores 20 is likewise transferred away from motor/generator 100.

Figure 8:
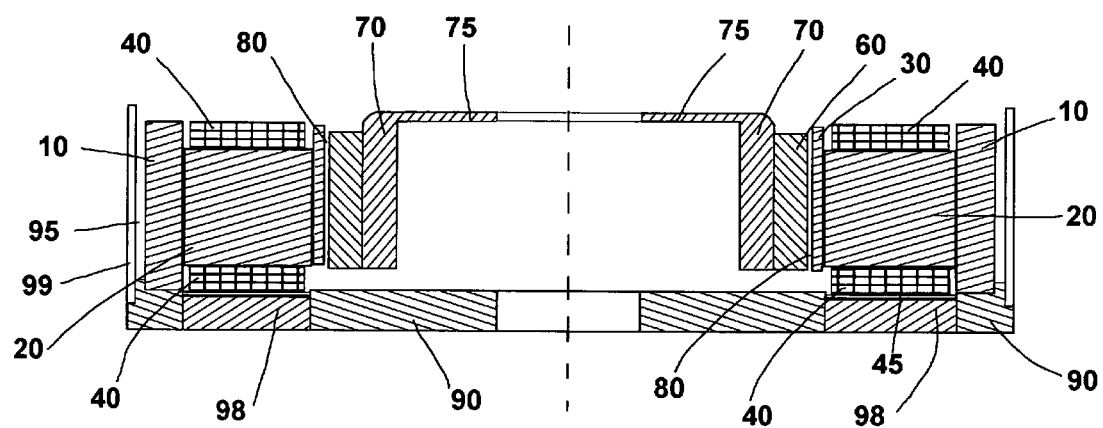
FIG. 8 is a diametrical cross-sectional elevation view of the motor/generator of FIG. 3, showing heat-conducting tabs that are employed to conduct heat away from a non-metallic stator plate.

In accordance with an alternative embodiment, stator plate 90 may be fabricated of a commercially available moldable engineered polymer material such as Ultem or PEEK. Use of such a non-metallic material eliminates eddy currents in stator plate 90 and results in a lighter weight and less expensive motor/generator 100. If this alternative is chosen, the imbedded liquid coolant tube 92 of FIGS. 4 and 5 may be eliminated, and heat-conducting tabs 98 can be inserted into the stator plate 90 directly beneath the sill pads 45 on which the electromagnets bear, as illustrated in FIG. 8. Heat-conducting tabs 98 are fabricated of a material such as copper or aluminum and are directly connected to a large external heat sink such as a vehicle body, or they are connected to the heat sink by way of a woven copper or aluminum heat-conducting strap. Use of the above-described alternative structure eliminates the need for an expensive liquid coolant and heat exchanger system and permits motor/generator 100 to be positioned in a closed location without the cooling benefit of outside air flow.

Figure 3A:
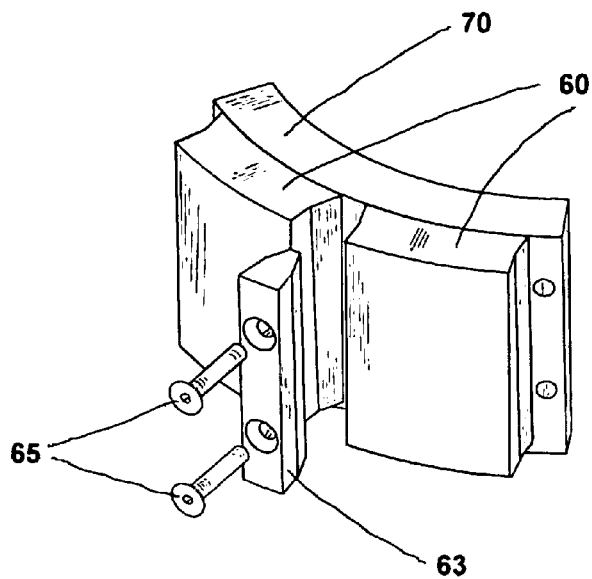
FIG. 3A is an isometric view showing the use of wedges for anchoring the permanent magnets to the rotor.
Figure 7:
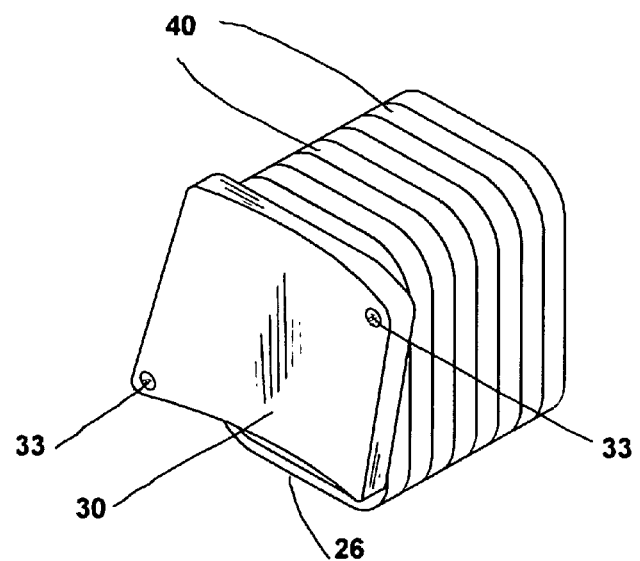
FIG. 7 is an isometric view of one of the electromagnets employed in the motor of the present invention, showing an associated shoe that is positioned adjacent to both the inner end of the electromagnet and the outer cylindrical surface of the rotor assembly, as illustrated in FIGS. 3 and 5.

The rotor assembly of motor/generator 100 is sized to provide an air gap 80 between the inner face of each of the electromagnet shoes 30 and the outer face of each of the permanent magnets 60. This air gap is minimized to be approximately 0.100". With additional reference to FIG. 3A, permanent magnets 60 are affixed to a rotor flux ring 70 which provides a magnetic flux path between the permanent magnets 60. The permanent magnets 60 are held in place on the rotor flux ring 70 by a series of aluminum wedges 63, rather than by the screws used in prior art motors. The permanent magnets 60 are shaped to have a wide base so that they can be captured by the wedges 63 to prevent the permanent magnets 60 from flying off the rotor flux ring 70 at high rotational speeds. In order to facilitate construction of motor/generator 100, wedges 63 are first positioned loosely. Each of the permanent magnets 60 is then slid into place with the wedges 63 acting as a positioning guide. The wedges are then tightened by means of wedge screws 65 that are inserted into rotor flux ring 70. Rare earth permanent magnets 60 like those used in the present invention are characteristically brittle. By employing wedges 63 to carry the rotational forces produced during operation of motor/generator 100, the prior art use of screws through each of the permanent magnets 60 that reduces the magnetic material and subjects it to high bearing forces is eliminated.

Permanent magnets 60 are preferably either samarium cobalt (SmCo) or neodymium iron boron (NdFeB). If NdFeB permanent magnets are used, they are electrically insulated from the wedges 63 and rotor flux ring 70 by means of a dielectric material 67 such as capton tape. Dielectric material 67 serves to prevent eddy currents generated in NdFeB permanent magnets 60 from flowing into rotor flux ring 70, rotor body 75, and then across the motor bearing that could cause it to pit and fail over time.

An output shaft may be conventionally attached to rotor body 75 to transfer the rotational energy produced by motor/generator 100 to an external load.

We claim:

1. One of a radial flux permanent magnet AC motor and generator comprising:
   a circular stator plate;
   a plurality of separately-formed electromagnet cores wound with wire to form a plurality of electromagnets;
   a separately-formed circular stator flux ring mounted on a top flat surface of said stator plate for providing a magnetic field path between said plurality of electromagnets, said stator flux ring having an inner cylindrical surface;
   said electromagnets being spaced equidistantly along said inner cylindrical surface of said stator flux ring to form an annular ring of electromagnets, said electromagnets having inner and outer surfaces and being positioned such that said outer surfaces of said electromagnets are in contact with said inner surface of said stator flux ring;
   a plurality of non-metallic anchor plates, one of said plurality of non-metallic anchor plates being mounted between two adjacent ones of said plurality of electromagnets on said top surface of said stator plate;
   a structural epoxy potting material filling a space between each one of said electromagnets and covering each of said anchor plates, said epoxy potting material and said anchor plates securing said ring of electromagnets against rotational forces produced during operation;
   a circular rotor mounted for rotation and positioned concentrically with said stator;
   a circular rotor flux ring mounted on said rotor, said rotor flux ring being axially and diametrically aligned with said stator flux ring, said rotor flux ring having an outer cylindrical surface;
   a plurality of permanent magnets mounted adjacent each other on said outer surface of said rotor flux ring to form an annular ring of permanent magnets within said annular ring of electromagnets, said permanent magnets having inner and outer surfaces and being positioned such that said inner surfaces of said permanent magnets contact said outer cylindrical surface of said rotor flux ring and said outer surfaces of said permanent magnets face said inner surfaces of said electromagnets across an air gap provided between said electromagnets; and
   a tube imbedded in said top surface of said stator plate, said tube formed to have two parallel circular legs, connected at one end in the form of a U and open at the other end to provide exit and entry ports for connection of the tube to an external coolant recirculation system, said parallel circular legs of said tube being imbedded in said top surface of said stator plate directly beneath said ring of electromagnets.

2. One of a radial flux permanent magnet AC motor and generator as in claim 1, further comprising a separate sill pad positioned between two adjacent ones of said electromagnets and said top surface of said stator plate, said sill pad having a sufficiently high dielectric constant to electrically insulate a bottom surface of an associated one of said electromagnets from said stator plate, said sill pad being formed to be sufficiently thin to conduct heat from an associated one of said electromagnets to said stator plate.

3. One of a radial flux permanent magnet AC motor and generator comprising:
    a circular stator plate;
    a plurality of separately-formed electromagnet cores wound with wire to form a plurality of electromagnets;
    a separately-formed circular stator flux ring mounted on a top flat surface of said stator plate for providing a magnetic field path between said plurality of electromagnets, said stator flux ring having an inner cylindrical surface;
    said electromagnets being spaced equidistantly along said inner cylindrical surface of said stator flux ring to form an annular ring of electromagnets, said electromagnets having inner and outer surfaces and being positioned such that said outer surfaces of said electromagnets are in contact with said inner surface of said stator flux ring;
    a plurality of non-metallic anchor plates, one of said plurality of non-metallic anchor plates being mounted between two adjacent ones of said plurality of electromagnets on said top surface of said stator plate;
    a structural epoxy potting material filling a space between each one of said electromagnets and covering each of said anchor plates, said epoxy potting material and said anchor plates securing said ring of electromagnets against rotational forces produced during operation;
    a circular rotor mounted for rotation and positioned concentrically with said stator;
    a circular rotor flux ring mounted on said rotor, said rotor flux ring being axially and diametrically aligned with said stator flux ring, said rotor flux ring having an outer cylindrical surface;
    a plurality of permanent magnets mounted adjacent each other on said outer surface of said rotor flux ring to form an annular ring of permanent magnets within said annular ring of electromagnets, said permanent magnets having inner and outer surfaces and being positioned such that said inner surfaces of said permanent magnets contact said outer cylindrical surface of said rotor flux ring and said outer surfaces of said permanent magnets face said inner surfaces of said electromagnets across an air gap provided between said electromagnets; and
    a plurality of heat-conducting tabs comprising a heat-conducting metal, each of said tabs being associated with one of said electromagnets, each of said tabs being imbedded in the top surface of said stator plate directly beneath an associated one of said electromagnets for conducting heat from said stator plate to an external heat sink.

4. One of a radial flux permanent magnet AC motor and generator as in claim 3, further comprising a separate sill pad positioned between a top surface of each one of said heat-conducting tabs and an associated one of said electromagnets, said sill pad having a sufficiently high dielectric constant to electrically insulate a bottom surface of an associated one of said electromagnets from said heat-conducting tab, said sill pad being formed to be sufficiently thin to conduct heat from an associated one of said electromagnets to said heat conducting tab.

5. One of a radial flux permanent magnet AC motor and generator as in claim 1, wherein each one of said plurality of separately-formed electromagnet cores comprises a powder metal core.

6. One of a radial flux permanent magnet AC motor and generator as in claim 1, wherein each one of said plurality of separately-formed electromagnet cores has rounded corners to permit winding of said cores with heavy gauge insulated wire in order to prevent the formation of an air gap between a first layer of said wire and said corners of said electromagnet cores.

7. One of a radial flux permanent magnet AC motor and generator as in claim 1, wherein:
    each one of said plurality of separately-formed electromagnet cores comprises a powder metal core; and
    each one of said plurality of separately-formed electromagnet cores is formed to have flat top, bottom, and side surfaces to facilitate heat dissipation and to maximize a volume of said wire wound onto said cores.

8. One of a radial flux permanent magnet AC motor and generator as in claim 1, further comprising a generally trapezoidal-shaped shoe member comprising a powder metal and positioned adjacent said inner surface of each of said electromagnets.

9. One of a radial flux permanent magnet AC motor and generator as in claim 1, wherein said stator flux ring comprises a powder metal material, said stator flux ring further comprising an inward protrusion between each one of said electromagnets for mechanically anchoring said electromagnets against rotational forces produced during operation.

10. One of a radial flux permanent magnet AC motor and generator as in claim 1, wherein said separately-formed stator flux ring comprises a continuous strip of flat electrical steel wound to form a laminated structure.

11. One of a radial flux permanent magnet AC motor and generator as in claim 1, further comprising a plurality of wedge members, one of which is positioned between two adjacent ones of said permanent magnets and mechanically attached to said rotor flux ring, each of said permanent magnets bearing on adjacent ones of said wedge members to transfer rotational forces, produced during operation, to said rotor.

12. One of a radial flux permanent magnet AC motor and generator as in claim 11, wherein side surfaces of said permanent magnets and side surfaces of said wedge members are matingly shaped to facilitate assembly of said permanent magnets on said rotor flux ring and to secure said permanent magnets against radial forces thereon produced during operation.

13. One of a radial flux permanent magnet AC motor and generator as in claim 1, wherein said stator plate comprises a metal stator plate.

14. One of a radial flux permanent magnet AC motor and generator as in claim 13, wherein said metal stator plate comprises an aluminum stator plate.

15. One of a radial flux permanent magnet AC motor and generator as in claim 1, wherein said stator plate comprises a non-metallic material.

16. One of a radial flux permanent magnet AC motor and generator as in claim 15, wherein said non-metallic material comprises an engineered polymer material.

17. One of a radial flux permanent magnet AC motor and generator as in claim 3, wherein each one of said plurality of separately-formed electromagnet cores comprises a powder metal core.

18. One of a radial flux permanent magnet AC motor and generator as in claim 3, wherein each one of said plurality of separately-formed electromagnet cores has rounded corners to permit winding of said cores with heavy gauge insulated wire in order to prevent the formation of an air gap between a first layer of said wire and said corners of said electromagnet cores.

19. One of a radial flux permanent magnet AC motor and generator as in claim 3, wherein:
   each one of said plurality of separately-formed electromagnet cores comprises a powder metal core; and
   each one of said plurality of separately-formed electromagnet cores is formed to have flat top, bottom, and side surfaces to facilitate heat dissipation and to maximize a volume of said wire wound onto said cores.

20. One of a radial flux permanent magnet AC motor and generator as in claim 3, further comprising a generally trapezoidal-shaped shoe member comprising a powder metal and positioned adjacent said inner surface of each of said electromagnets.

21. One of a radial flux permanent magnet AC motor and generator as in claim 3, wherein said stator flux ring comprises a powder metal material, said stator flux ring further comprising an inward protrusion between each one of said electromagnets for mechanically anchoring said electromagnets against rotational forces produced during operation.

22. One of a radial flux permanent magnet AC motor and generator as in claim 3, wherein said separately-formed stator flux ring comprises a continuous strip of flat electrical steel wound to form a laminated structure.

23. One of a radial flux permanent magnet AC motor and generator as in claim 3, further comprising a plurality of wedge members, one of which is positioned between two adjacent ones of said permanent magnets and mechanically attached to said rotor flux ring, each of said permanent magnets bearing on adjacent ones of said wedge members to transfer rotational forces, produced during operation, to said rotor.

24. One of a radial flux permanent magnet AC motor and generator as in claim 3, wherein side surfaces of said permanent magnets and side surfaces of said wedge members are matingly shaped to facilitate assembly of said permanent magnets on said rotor flux ring and to secure said permanent magnets against radial forces thereon produced during operation.

25. One of a radial flux permanent magnet AC motor and generator as in claim 3, wherein said stator plate comprises a metal stator plate.

26. One of a radial flux permanent magnet AC motor and generator as in claim 25, wherein said metal stator plate comprises an aluminum stator plate.

27. One of a radial flux permanent magnet AC motor and generator as in claim 3, wherein said stator plate comprises a non-metallic material.

28. One of a radial flux permanent magnet AC motor and generator as in claim 27, wherein said non-metallic material comprises an engineered polymer material.

29. One of a radial flux permanent magnet AC motor and generator comprising:
   a stator plate;
   a plurality of separately-formed electromagnet cores wound with wire to form a plurality of electromagnets;
   a separately-formed circular stator flux ring mounted on a top flat surface of said stator plate for providing a magnetic field path between said plurality of electromagnets, said stator flux ring having an inner cylindrical surface;
   said electromagnets being spaced equidistantly along said inner cylindrical surface of said stator flux ring to form an annular ring of electromagnets, said electromagnets having inner and outer surfaces and being positioned such that said outer surfaces of said electromagnets are in contact with said inner surface of said stator flux ring;
   a plurality of non-metallic anchor plates, one of said plurality of non-metallic anchor plates being mounted between two adjacent ones of said plurality of electromagnets on said top surface of said stator plate;
   a structural epoxy potting material filling a space between each one of said electromagnets and covering each of said anchor plates, said epoxy potting material and said anchor plates securing said ring of electromagnets against rotational forces produced during operation;
   a circular rotor mounted for rotation and positioned concentrically with said stator;
   a circular rotor flux ring mounted on said rotor, said rotor flux ring being axially and diametrically aligned with said stator flux ring, said rotor flux ring having an outer cylindrical surface;
   a plurality of permanent magnets mounted adjacent each other on said outer surface of said rotor flux ring to form an annular ring of permanent magnets within said annular ring of electromagnets, said permanent magnets having inner and outer surfaces and being positioned such that said inner surfaces of said permanent magnets contact said outer cylindrical surface of said rotor flux ring and said outer surfaces of said permanent magnets face said inner surfaces of said electromagnets across an air gap provided between said electromagnets; and
   a tube imbedded in said top surface of said stator plate, said tube formed to have two parallel circular legs, connected at one end in the form of a U and open at the other end to provide exit and entry ports for connection of the tube to an external coolant recirculation system, said parallel circular legs of said tube being imbedded in said top surface of said stator plate directly beneath said ring of electromagnets.

30. One of a radial flux permanent magnet AC motor and generator as in claim 29, further comprising a separate sill pad positioned between two adjacent ones of said electromagnets and said top surface of said stator plate, said sill pad having a sufficiently high dielectric constant to electrically insulate a bottom surface of an associated one of said electromagnets from said stator plate, said sill pad being formed to be sufficiently thin to conduct heat from an associated one of said electromagnets to said stator plate.

31. One of a radial flux permanent magnet AC motor and generator comprising:
   a stator plate;
   a plurality of separately-formed electromagnet cores wound with wire to form a plurality of electromagnets;
   a separately-formed circular stator flux ring mounted on a top flat surface of said stator plate for providing a magnetic field path between said plurality of electromagnets, said stator flux ring having an inner cylindrical surface;
   said electromagnets being spaced equidistantly along said inner cylindrical surface of said stator flux ring to form an annular ring of electromagnets, said electromagnets having inner and outer surfaces and being positioned such that said outer surfaces of said electromagnets are in contact with said inner surface of said stator flux ring;
   a plurality of non-metallic anchor plates, one of said plurality of non-metallic anchor plates being mounted between two adjacent ones of said plurality of electromagnets on said top surface of said stator plate;
   a structural epoxy potting material filling a space between each one of said electromagnets and covering each of said anchor plates, said epoxy potting material and said anchor plates securing said ring of electromagnets against rotational forces produced during operation;

a circular rotor mounted for rotation and positioned concentrically with said stator;

a circular rotor flux ring mounted on said rotor, said rotor flux ring being axially and diametrically aligned with said stator flux ring, said rotor flux ring having an outer cylindrical surface;

a plurality of permanent magnets mounted adjacent each other on said outer surface of said rotor flux ring to form an annular ring of permanent magnets within said annular ring of electromagnets, said permanent magnets having inner and outer surfaces and being positioned such that said inner surfaces of said permanent magnets contact said outer cylindrical surface of said rotor flux ring and said outer surfaces of said permanent magnets face said inner surfaces of said electromagnets across an air gap provided between said electromagnets; and a plurality of heat-conducting tabs comprising a heat-conducting metal, each of said tabs being associated with one of said electromagnets, each of said tabs being imbedded in the top surface of said stator plate directly beneath an associated one of said electromagnets for conducting heat from said stator plate to an external heat sink.

32. One of a radial flux permanent magnet AC motor and generator as in claim 31, further comprising a separate sill pad positioned between a top surface of each one of said heat-conducting tabs and an associated one of said electromagnets, said sill pad having a sufficiently high dielectric constant to electrically insulate a bottom surface of an associated one of said electromagnets from said heat-conducting tab, said sill pad being formed to be sufficiently thin to conduct heat from an associated one of said electromagnets to said heat conducting tab.

33. One of a radial flux permanent magnet AC motor and generator as in claim 29, wherein each one of said plurality of separately-formed electromagnet cores comprises a powder metal core.

34. One of a radial flux permanent magnet AC motor and generator as in claim 29, wherein each one of said plurality of separately-formed electromagnet cores has rounded corners to permit winding of said cores with heavy gauge insulated wire in order to prevent the formation of an air gap between a first layer of said wire and said corners of said electromagnet cores.

35. One of a radial flux permanent magnet AC motor and generator as in claim 29, wherein:

each one of said plurality of separately-formed electromagnet cores comprises a powder metal core; and each one of said plurality of separately-formed electromagnet cores is formed to have flat top, bottom, and side surfaces to facilitate heat dissipation and to maximize a volume of said wire wound onto said cores.

36. One of a radial flux permanent magnet AC motor and generator as in claim 29, further comprising a generally trapezoidal-shaped shoe member comprising a powder metal and positioned adjacent said inner surface of each of said electromagnets.

37. One of a radial flux permanent magnet AC motor and generator as in claim 29, wherein said stator flux ring comprises a powder metal material, said stator flux ring further comprising an inward protrusion between each one of said electromagnets for mechanically anchoring said electromagnets against rotational forces produced during operation.

38. One of a radial flux permanent magnet AC motor and generator as in claim 29, wherein said separately-formed stator flux ring comprises a continuous strip of flat electrical steel wound to form a laminated structure.

39. One of a radial flux permanent magnet AC motor and generator as in claim 29, further comprising a plurality of wedge members, one of which is positioned between two adjacent ones of said permanent magnets and mechanically attached to said rotor flux ring, each of said permanent magnets bearing on adjacent ones of said wedge members to transfer rotational forces, produced during operation, to said rotor.

40. One of a radial flux permanent magnet AC motor and generator as in claim 39, wherein side surfaces of said permanent magnets and side surfaces of said wedge members are matingly shaped to facilitate assembly of said permanent magnets on said rotor flux ring and to secure said permanent magnets against radial forces thereon produced during operation.

41. One of a radial flux permanent magnet AC motor and generator as in claim 29, wherein said stator plate comprises a metal stator plate.

42. One of a radial flux permanent magnet AC motor and generator as in claim 41, wherein said metal stator plate comprises an aluminum stator plate.

43. One of a radial flux permanent magnet AC motor and generator as in claim 29, wherein said stator plate comprises a non-metallic material.

44. One of a radial flux permanent magnet AC motor and generator as in claim 43, wherein said non-metallic material comprises an engineered polymer material.

45. One of a radial flux permanent magnet AC motor and generator as in claim 31, wherein each one of said plurality of separately-formed electromagnet cores comprises a powder metal core.

46. One of a radial flux permanent magnet AC motor and generator as in claim 31, wherein each one of said plurality of separately-formed electromagnet cores has rounded corners to permit winding of said cores with heavy gauge insulated wire in order to prevent the formation of an air gap between a first layer of said wire and said corners of said electromagnet cores.

47. One of a radial flux permanent magnet AC motor and generator as in claim 31, wherein:

each one of said plurality of separately-formed electromagnet cores comprises a powder metal core; and each one of said plurality of separately-formed electromagnet cores is formed to have flat top, bottom, and side surfaces to facilitate heat dissipation and to maximize a volume of said wire wound onto said cores.

48. One of a radial flux permanent magnet AC motor and generator as in claim 31, further comprising a generally trapezoidal-shaped shoe member comprising a powder metal and positioned adjacent said inner surface of each of said electromagnets.

49. One of a radial flux permanent magnet AC motor and generator as in claim 31, wherein said stator flux ring comprises a powder metal material, said stator flux ring further comprising an inward protrusion between each one of said electromagnets for mechanically anchoring said electromagnets against rotational forces produced during operation.

50. One of a radial flux permanent magnet AC motor and generator as in claim 31, wherein said separately-formed stator flux ring comprises a continuous strip of flat electrical steel wound to form a laminated structure.

51. One of a radial flux permanent magnet AC motor and generator as in claim 31, further comprising a plurality of wedge members, one of which is positioned between two adjacent ones of said permanent magnets and mechanically attached to said rotor flux ring, each of said permanent magnets bearing on adjacent ones of said wedge members to transfer rotational forces, produced during operation, to said rotor.

52. One of a radial flux permanent magnet AC motor and generator as in claim 51, wherein side surfaces of said permanent magnets and side surfaces of said wedge members are matingly shaped to facilitate assembly of said permanent magnets on said rotor flux ring and to secure said permanent magnets against radial forces thereon produced during operation.

53. One of a radial flux permanent magnet AC motor and generator as in claim 31, wherein said stator plate comprises a metal stator plate.

54. One of a radial flux permanent magnet AC motor and generator as in claim 53, wherein said metal stator plate comprises an aluminum stator plate.

55. One of a radial flux permanent magnet AC motor and generator as in claim 31, wherein said stator plate comprises a non-metallic material.

56. One of a radial flux permanent magnet AC motor and generator as in claim 55, wherein said non-metallic material comprises an engineered polymer material.

\* \* \* \* \*